US007480255B2

(12) United States Patent
Bettink

(10) Patent No.: US 7,480,255 B2
(45) Date of Patent: Jan. 20, 2009

(54) DATA STRUCTURE IDENTIFYING FOR MULTIPLE ADDRESSES THE REVERSE PATH FORWARDING INFORMATION FOR A COMMON INTERMEDIATE NODE AND ITS USE

(75) Inventor: John H. W. Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 10/856,558

(22) Filed: May 27, 2004

(65) Prior Publication Data

US 2005/0265328 A1    Dec. 1, 2005

(51) Int. Cl.
*H04L 12/28* (2006.01)
*H04L 12/56* (2006.01)
(52) U.S. Cl. .................................. 370/254; 370/395.32
(58) Field of Classification Search ................. 370/252, 370/254, 389, 395.32, 395.54, 400, 401
See application file for complete search history.

(56) References Cited

U.S. PATENT DOCUMENTS

| | | | |
|---|---|---|---|
| 5,680,566 A | | 10/1997 | Peng et al. |
| 5,829,004 A | * | 10/1998 | Au ............................. 707/100 |
| 5,917,820 A | | 6/1999 | Rekhter |
| 6,018,524 A | | 1/2000 | Turner et al. |
| 6,067,574 A | | 5/2000 | Tzeng |
| 6,091,725 A | | 7/2000 | Cheriton et al. |
| 6,295,576 B1 | | 9/2001 | Ogura et al. |
| 6,308,219 B1 | * | 10/2001 | Hughes ....................... 709/238 |
| 6,374,326 B1 | | 4/2002 | Kansal et al. |
| 6,560,610 B1 | * | 5/2003 | Eatherton et al. ........ 707/104.1 |
| 6,614,789 B1 | * | 9/2003 | Yazdani et al. .............. 370/392 |
| 6,654,734 B1 | | 11/2003 | Mani et al. |
| 6,658,002 B1 | | 12/2003 | Ross et al. |
| 6,715,029 B1 | | 3/2004 | Trainin et al. |

(Continued)

OTHER PUBLICATIONS

Tong-Bi Pei and Charles Zukowski, "VLSI Implementation of Routing Tables: Tries and CAMS," Networking in the Nineties, Proceedings of the Annual Joint Conference of the Computer and Communications Societies, New York, Apr. 7, 1991, pp. 515-524, vol. 2, Conf. 10.

(Continued)

*Primary Examiner*—Hong Sol Cho
(74) *Attorney, Agent, or Firm*—The Law Office of Kirk D. Williams

(57) ABSTRACT

Disclosed are, inter alia, methods, apparatus, data structures, computer-readable media, mechanisms, and means for maintaining and using a data structure identifying for multiple addresses the reverse path forwarding information for a common intermediate node. A data structure includes an address lookup data structure for identifying leaf nodes of multiple leaf nodes corresponding to matching addresses. Each of the multiple leaf nodes includes a reverse path forwarding indirection link to a corresponding sub-data structure indicating reverse path forwarding information. Each of a particular set of leaf nodes having a same intermediate reachability node in a network includes a particular indirection link to a same particular sub-data structure indicating reverse path forwarding information. The intermediate reachability node may or may not be a gateway node to a different intranet. The intermediate reachability node is typically a node in the network which traffic between a node and multiple other nodes must traverse

12 Claims, 9 Drawing Sheets

U.S. PATENT DOCUMENTS

| | | | |
|---|---|---|---|
| 6,717,946 B1 | 4/2004 | Hariguchi et al. | |
| 6,775,737 B1 | 8/2004 | Warkhede et al. | |
| 6,934,252 B2 * | 8/2005 | Mehrotra et al. | 370/229 |
| 2001/0040895 A1 | 11/2001 | Templin | |
| 2002/0143747 A1 * | 10/2002 | Tal et al. | 707/3 |
| 2003/0174717 A1 * | 9/2003 | Zabarski et al. | 370/401 |
| 2003/0223402 A1 | 12/2003 | Sanchez et al. | |
| 2004/0030803 A1 | 2/2004 | Eatherton et al. | |
| 2004/0100950 A1 * | 5/2004 | Basu et al. | 370/389 |
| 2005/0021752 A1 * | 1/2005 | Marimuthu et al. | 709/225 |

OTHER PUBLICATIONS

Anthony McAuley and Paul Francis, "Fast Routing Table Lookup Using CAMs," Networking: Foundation for the Future, Proceedings of the Annual Joint Conference of the Computer and Communications Societies, Los Alamitos, Mar. 28, 1993, pp. 1382-1391, vol. 2, Conf 12.

P. Ferguson, "Network Ingress Filtering: Defeating Denial of Service Attacks which employ IP Source Address Spoofing," RFC 2827, May 2000, 10 pages, Internet Engineering Task Force, www.ietf.org.

Yogen K. Dalal and Robert M. Metcalf, "Reverse Forwarding of Broadcast Packets," pp. 1040-1048, Dec. 1978, Xerox Corporation and Stanford University.

"Unicast Reverse Path Forwarding," Cisco IOS Release 11.1(17)CC, pp.1-22, Cisco Systems, Inc., Oct. 1, 2002.

"Unicast Reverse Path Forwarding Enhancements," Cisco IOS Release 12.1(2)T, pp. 1-14, Cisco Systems, Inc., Sep. 8, 2002.

"Configuring Unicast Reverse Path Forwarding," Cisco IOS Security Configuration Guide, pp. SC-455-SC-470, Sep. 15, 2002.

U.S. Appl. No. 10/651,179, filed Aug. 28, 2003, Marimuthu et al.

* cited by examiner

RPF
INFORMATION
401

BITMAP WHERE EACH BIT REPRESENTS A
DIFFERENT INTERFACE AND EACH VALUE
INDICATES WHETHER IT IS ALLOWABLE OR NOT

RPF
INFORMATION
402

LIST OF ONE OR MORE
ALLOWABLE INTERFACES

FIGURE 4

DATA STRUCTURE IDENTIFYING FOR MULTIPLE ADDRESSES THE REVERSE PATH FORWARDING INFORMATION FOR A COMMON INTERMEDIATE NODE AND ITS USE

TECHNICAL FIELD

One embodiment of the invention relates to communications and computer systems, especially routers, packet switching systems, and other devices; and more particularly, one embodiment relates to a data structure identifying for multiple addresses the reverse path forwarding information for a common intermediate node and its use.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

RFC 2827 describes the need to implement unicast reverse path forwarding(RPF) to prevent source address forging. FIG. 1A shows an example prior art router or switch having multiple line cards, each typically with multiple interfaces. Strict-mode reverse path forwarding requires that the source address of a packet received on an interface must be reachable from that interface.

For example, FIG. 1B illustrates two connected intranets, each having four routers. Denoted are two routers A and B, with router A having interfaces A-1 and A-2 connected to links to other routers as shown. If router B sends a packet to router A and if the packet is received on interface A-2, then the RPF condition is satisfied, and the packet is processed and forwarded. However, if the packet is received on interface A-1, then it is invalid as the routing reachability information will not include interface A-1 as there is a lower-cost path to reach node B in the network.

There are two known ways for performing the RPF checking. First, static access control lists (ACLs) can be manually created by an operator to specify the source addresses allowed on a particular interface. Major disadvantages of this approach include that different ACLs need to be manually defined for each interface, and these ACLs need to be manually updated to accommodate changes in the network topology to provide proper protection.

A second known approach is to perform two lookup operations on the forwarding information base (FIB): one based on the destination to identify a location which to forward the packet and a second lookup operation based on the source address of the packet to identify whether the packet was received on an allowed interface. This approach requires a second lookup operation on the FIB, which either decreases the rate at which packets can be forwarded (as it requires two lookups instead of just one) or it requires additional or duplicated components to perform these two lookup operations in parallel. Moreover, a third lookup operation is typically also performed, this one on a set of predefined ACLs to further identify how to process the packet. Performing all these lookup operations affects the rate at which packets can be processed and/or the amount of hardware and software required to perform such operations.

In one known approach, when unicast reverse path forwarding is enabled on an interface, the router examines all packets received on that interface. The router checks to make sure that the source address appears in the routing table and matches the interface on which the packet was received. This feature checks to see if any packet received at a router interface arrives on one of the best return paths to the source of the packet. The feature does this by doing a reverse lookup in the routing/forwarding information base based on the source address of the packet. If a corresponding reverse path for the packet is not located, this feature can drop or forward the packet, depending on whether an ACL is specified in a configuration command. If an ACL is specified in the command, then when (and only when) a packet fails the unicast reverse path forwarding check, the ACL is checked to see if the packet should be dropped (using a deny statement in the ACL) or forwarded (using a permit statement in the ACL). If no ACL is specified in the configuration command, the router drops the forged or malformed packet immediately.

Shown in FIG. 1C is a prior art data structure used specifying the RPF information for various source addresses. The data structure includes some information to perform a lookup operation on an address to identify a corresponding leaf node (i.e., a sub-data structure for the corresponding address, not limited to a tree type data structure, with the term "sub-data structure" intended to merely imply that it is reached via a lookup or other retrieval operation).

For example, there are an unlimited number of mechanisms for performing a lookup operation on an address to identify a leaf node, such as, but not limited to placing address in an associative memory, performing a direct or hashed lookup on the address or several strides of the address (i.e., MTRIE, etc.), tree bitmap (e.g., that disclosed in U.S. Pat. No. 6,560,610, issued May, 6, 2003, which is hereby incorporated by reference), compressed prefix matching database searching (e.g., that disclosed in U.S. Pat. No. 5,781,772, issued Jul. 14, 1998, which is hereby incorporated by reference), and an unlimited number of other lookup mechanisms and approaches.

As shown in FIG. 1C, each leaf node corresponding to a different address contained a bitmap indicating on which valid interface or interfaces a packet with the corresponding source address could be received. Thus, each address stored in the data structure (and for large routers this could be thousands or millions of addresses) contained its corresponding RPF information, and each of which must be maintained.

Identifying routing changes in a network is well-known. For example, a border gateway protocol (BGP) and interior gateway protocol (IGP) are commonly used to maintain routing information/network topology information about a network. BGP-4 is specified in RFC 1654, which is incorporated by reference. RIP is a commonly used IGP, and is specified in RFC 1058 and RFC 1723, which are both hereby incorporated by reference. Based on the BGP and IGP messages sent and received, each router maintains its routing database including reachability information (e.g., how to send a packet to reach its intended destination), and identifies changes in the reachability information.

FIG. 1D illustrates an update mechanism used to update each of these bitmaps for a particular routing change, which was associated with a linked list of pointers indicating the leaf nodes which must be updated for the particular update. A particular routing change to the route to reach a node may change a single one or even a large number (e.g., up to tens of thousands or even more) of RPF information as each bitmap has to be updated accordingly. Thus, in certain network configurations, a large number of updates must to be performed for a single change in reachability information (e.g. a change in the network topology). Such a mechanism has been used for a significant period of time as a better approach was desired, but not discovered.

SUMMARY

Disclosed are, inter alia, methods, apparatus, data structures, computer-readable media, mechanisms, and means for maintaining and using a data structure identifying for multiple addresses the reverse path forwarding information for a common intermediate node.

One embodiment stores on one or more computer-readable media a data structure that includes an address lookup data structure for identifying leaf nodes of multiple leaf nodes corresponding to matching addresses. Each of the multiple leaf nodes includes a reverse path forwarding indirection link to a corresponding sub-data structure indicating reverse path forwarding information. Each of a particular set of leaf nodes having a same intermediate reachability node in a network includes a particular indirection link to a same particular sub-data structure indicating reverse path forwarding information.

In one embodiment, the particular sub-data structure indicates one or more allowable interfaces using a bitmap representation. In one embodiment, the particular sub-data structure indicates one or more allowable interfaces using a list of interface identifiers. In one embodiment, the particular sub-data structure is updated in response to a routing update affecting reachability information for the same intermediate reachability node in the network. In one embodiment, the intermediate reachability node is a gateway node to a different intranet.

One embodiment determines reverse path forwarding information by performing a lookup operation on an address lookup data structure based on a particular address of a particular packet to identify a leaf node corresponding to the particular address. The leaf node includes a reverse path forwarding indirection link. The link is traversed based on the reverse path forwarding indirection link to a particular reverse path sub-data structure identifying whether or not an interface on which the particular packet was received was allowable or not. Each of a particular set of the leaf nodes having a same intermediate reachability node in a network includes a particular indirection link to the same particular sub-data structure. In one embodiment, the intermediate reachability node is a gateway node to a different intranet.

One embodiment for performing lookup operations to identify reverse path forwarding information includes one or more computer-readable media configured to store an address lookup data structure for identifying leaf nodes of a plurality of leaf nodes corresponding to matching addresses, and one or more lookup engines for performing lookup operations on the address lookup data structure. Each of the leaf nodes in the data structure includes a reverse path forwarding indirection link to a corresponding sub-data structure indicating reverse path forwarding information. Each of a particular set of the leaf nodes having a same intermediate reachability node in a network includes a particular indirection link to a same particular sub-data structure indicating reverse path forwarding information. In one embodiment, the intermediate reachability node is a gateway node to a different intranet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4 includes block diagrams of two different mechanisms used to maintain RPF information in a sub-data structure;

DETAILED DESCRIPTION

Figure 1A:
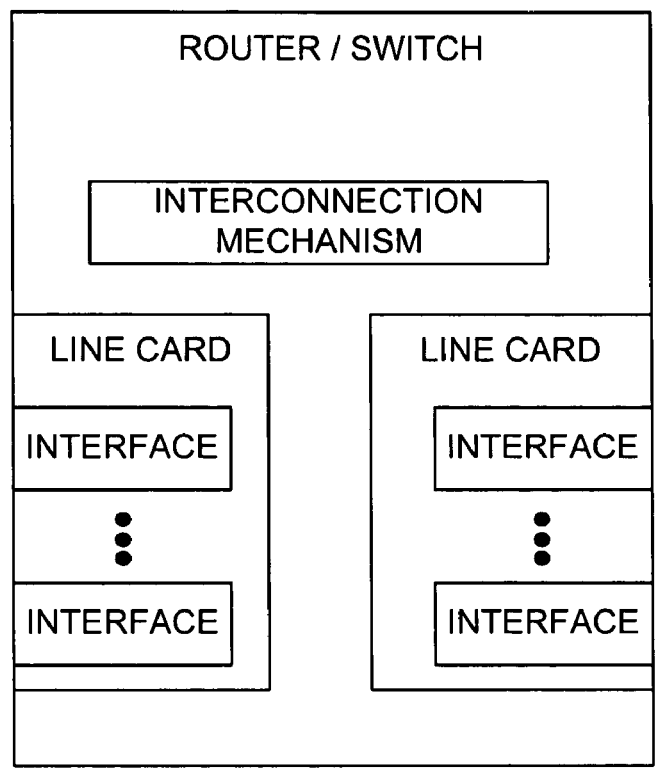
FIG. 1A is a block diagram illustrating a high-level view of a router or switch.
Figure 1B:
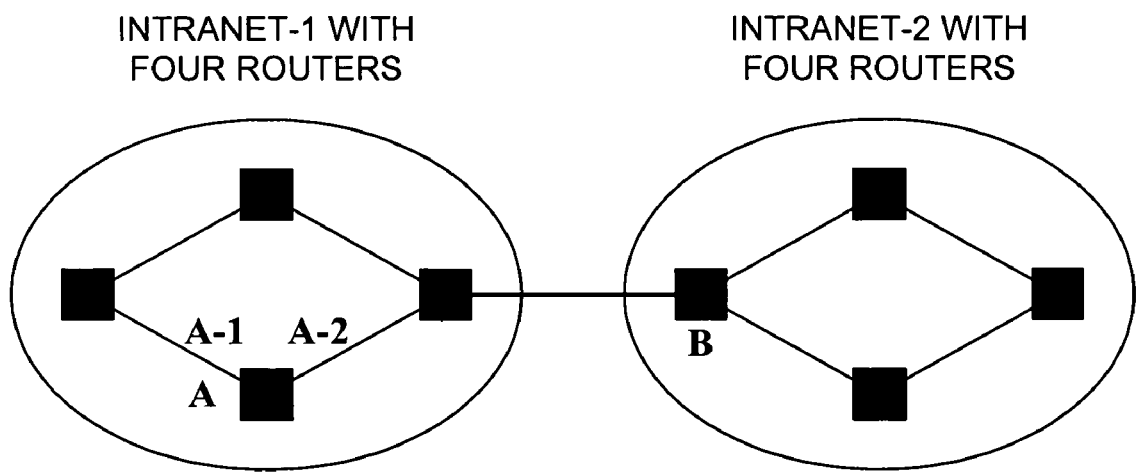
FIG. 1B is a block diagram illustrating a network.
Figure 1C:
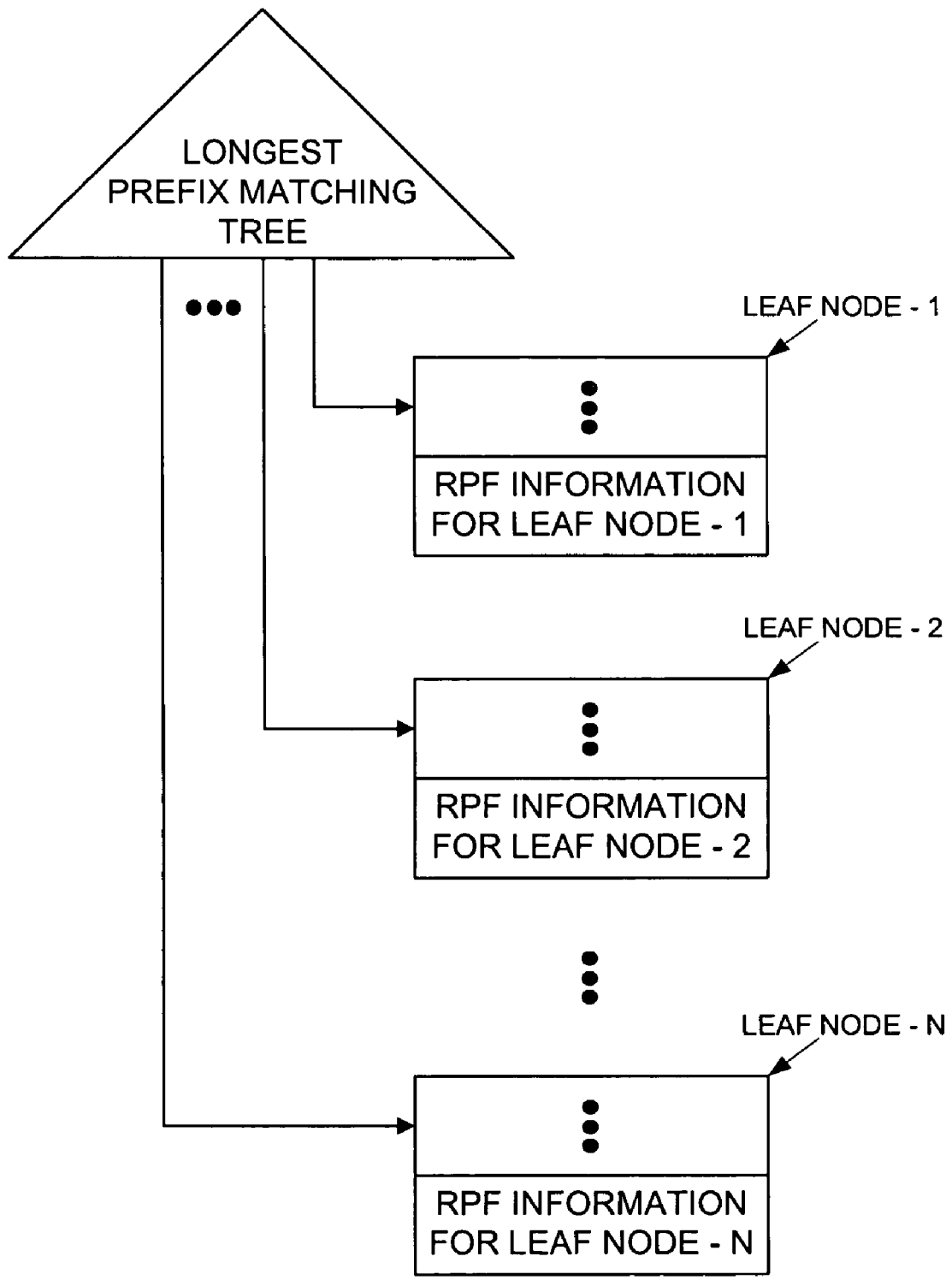
FIG. 1C is a block diagram of a prior-art data structure for maintaining RPF information.
Figure 1D:
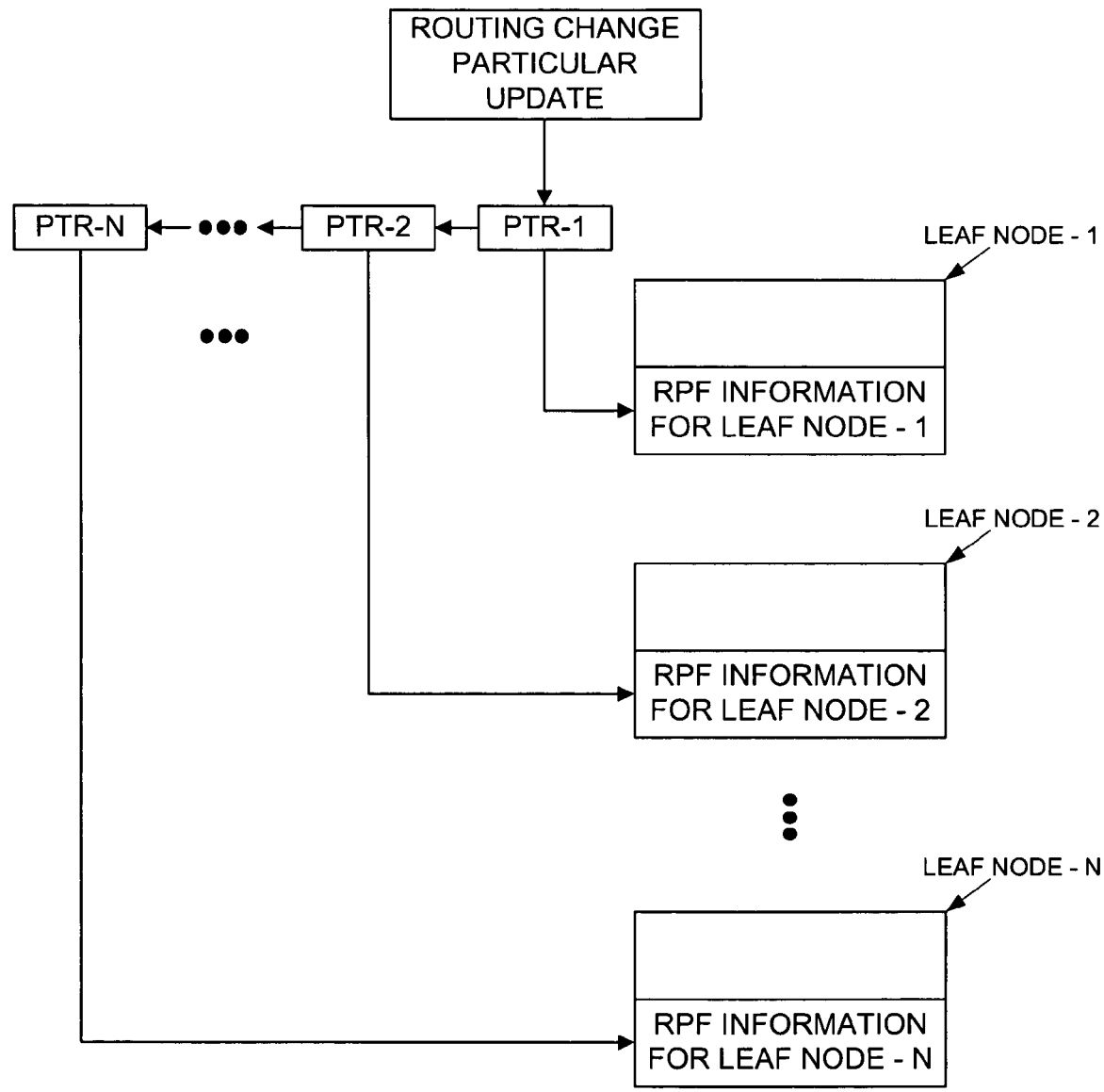
FIG. 1D is a block diagram illustrating the updating of RPF information in response to a routing change as performed in a prior art system.

Disclosed are, inter alia, methods, apparatus, data structures, computer-readable media, mechanisms, and means for maintaining and using a data structure identifying for multiple addresses the reverse path forwarding information for a common intermediate node.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device and storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for maintaining and using a data structure identifying for multiple addresses the reverse path forwarding information for a common intermediate node.

One embodiment stores on one or more computer-readable media a data structure that includes an address lookup data structure for identifying leaf nodes of multiple leaf nodes corresponding to matching addresses. Each of the multiple leaf nodes includes a reverse path forwarding indirection link to a corresponding sub-data structure indicating reverse path forwarding information. Each of a particular set of leaf nodes having a same intermediate reachability node in a network includes a particular indirection link to a same particular sub-data structure indicating reverse path forwarding information.

In one embodiment, the particular sub-data structure indicates one or more allowable interfaces using a bitmap representation. In one embodiment, the particular sub-data structure indicates one or more allowable interfaces using a list of interface identifiers. In one embodiment, the particular sub-data structure is updated in response to a routing update affecting reachability information for the same intermediate reachability node in the network. In one embodiment, the intermediate reachability node is a gateway node to a different intranet.

One embodiment determines reverse path forwarding information by performing a lookup operation on an address lookup data structure based on a particular address of a particular packet to identify a leaf node corresponding to the particular address. The leaf node includes a reverse path forwarding indirection link. The link is traversed based on the reverse path forwarding indirection link to a particular reverse path sub-data structure identifying whether or not an interface on which the particular packet was received was allowable or not. Each of a particular set of the leaf nodes having a same intermediate reachability node in a network includes a particular indirection link to the same particular sub-data structure. In one embodiment, the intermediate reachability node is a gateway node to a different intranet.

One embodiment for performing lookup operations to identify reverse path forwarding information includes one or more computer-readable media configured to store an address lookup data structure for identifying leaf nodes of a plurality of leaf nodes corresponding to matching addresses, and one or more lookup engines for performing lookup operations on the address lookup data structure. Each of the leaf nodes in the data structure includes a reverse path forwarding indirection link to a corresponding sub-data structure indicating reverse path forwarding information. Each of a particular set of the leaf nodes having a same intermediate reachability node in a network includes a particular indirection link to a same particular sub-data structure indicating reverse path forwarding information. In one embodiment, the intermediate reachability node is a gateway node to a different intranet.

Figure 2:
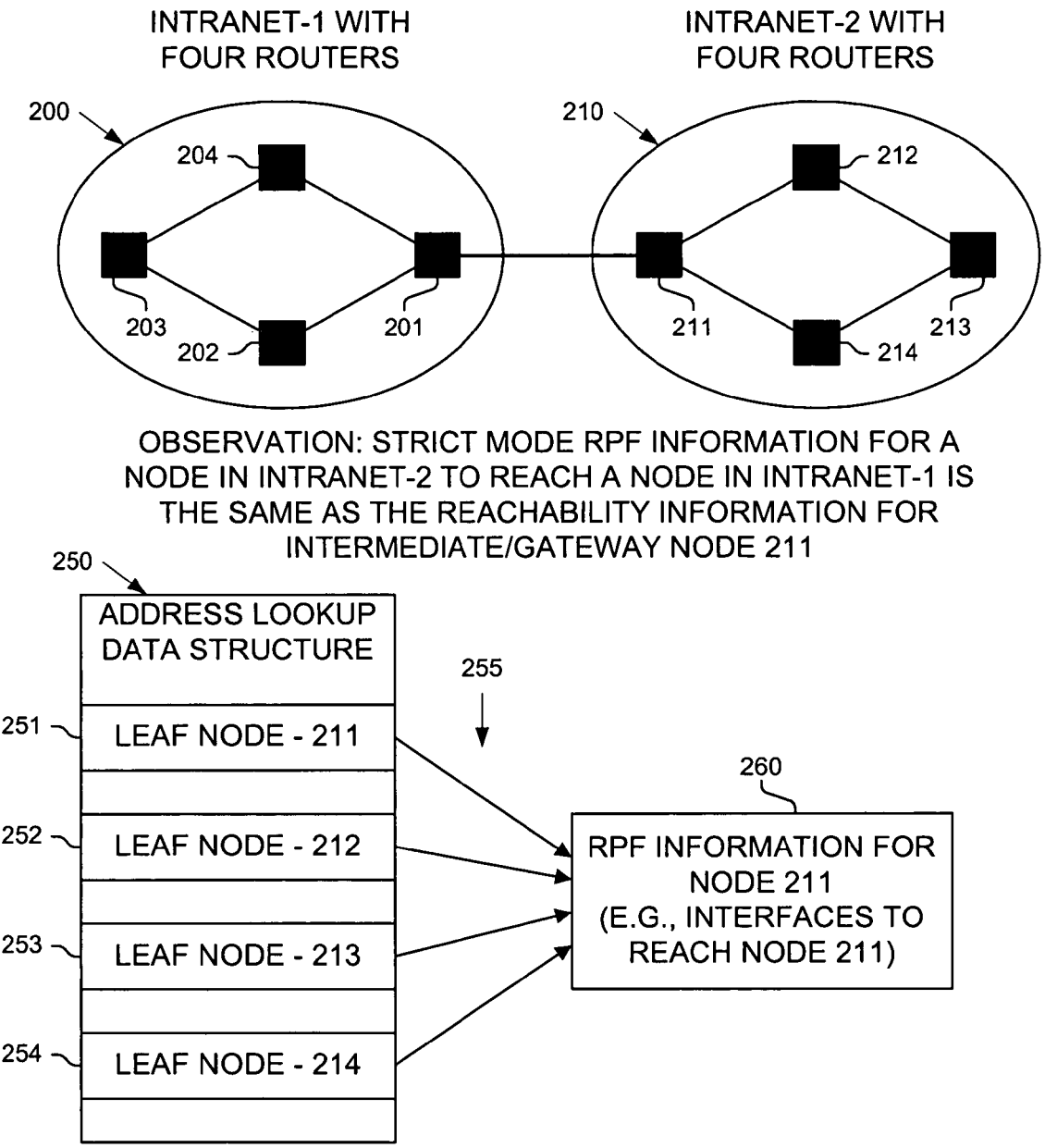
FIG. 2 is a block diagram illustrating a network used to illustrate corresponding RPF information maintained in one embodiment.

Turning to the figures, FIG. 2 is a block diagram illustrating an exemplary network used to illustrate corresponding RPF information maintained in one embodiment. As shown, the exemplary network includes intranet 200 (including nodes 201-204) and intranet 210 (including nodes 211-214). An observation is made that for strict mode reverse path forwarding, the RPF/reachability information for each node 201-204 in intranet-1 200 to a node 211-214 in intranet 210 is the same as that for the intermediate/gateway node 211. As such, each line card of each node 201-204 can maintain RPF information for nodes 211-214 by maintaining a single set of RPF information for node 211 and link all leaf nodes in an address lookup data structure to the single set of RPF information. This is illustrated in FIG. 2 by address lookup data structure 250 including leaf nodes 251-254 corresponding to nodes 211-214 respectively in the exemplary network including intranets 200 and 210. Each leaf node 251-254 includes an indirect reference 255 (e.g., pointer, link, offset value, hash value, relative value, absolute value, etc.) to RPF sub-data structure 260 which includes RPF information for node 211. Note, the maintained RPF information 260 in each of nodes 201-204 may be the same, but is typically different as the reachability information to reach node 211 is typically different for nodes 201-204. In one embodiment, the intermediate reachability node is a gateway node to a different intranet. In one embodiment, the intermediate node is not a gateway node to a different intranet. In one embodiment, the intermediate node is a node in the network which traffic between a node and multiple other nodes must traverse.

Figure 3:
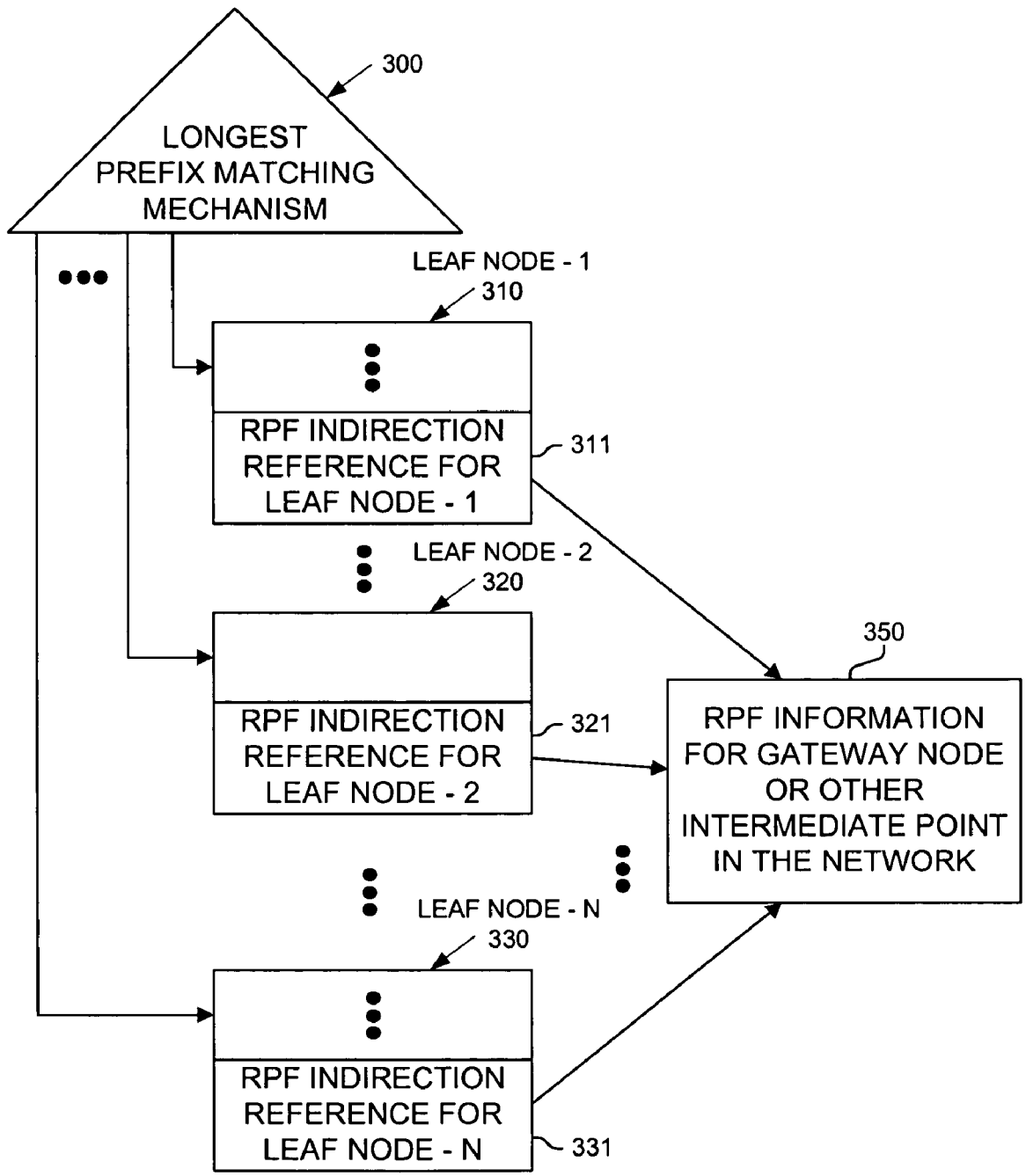
FIG. 3 is a block diagram illustrating an address lookup data structure and sub-data structure for maintaining RPF information common to multiple leaf nodes corresponding to different addresses reachable through a common intermediate node used in one embodiment.

FIG. 3 is a block diagram illustrating an address lookup data structure and sub-data structure for maintaining RPF information common to multiple leaf nodes corresponding to different addresses reachable through a common intermediate node used in one embodiment. As shown, the address lookup data structure typically includes longest prefix matching mechanism 300 and leaf nodes 310, 320 and 330, and possibly sub-data structure 350 (as it can be viewed to be included in the address lookup data structure, in another data structure, or a stand alone data structure). Based on a source address of a received packet, a lookup operation is performed by longest prefix matching mechanism 300 to identify a corresponding leaf node 310, 320 or 330. Each of leaf nodes 310, 320 and 330 include an indirect reference (311, 321, 331) to sub-data structure 350. The corresponding indirect reference (311, 321, 331) is traversed to identify and retrieve sub-data structure 350, which includes the RPF information for a corresponding gateway node or other intermediate point in the network. Based on this RPF information and the interface on which the packet was received, a determination can be made whether to process or drop the packet. Note, in one embodiment, longest prefix matching mechanism 300 is used to determine routing information by performing a lookup operation on a destination address of a packet to identify a corresponding leaf node, which includes routing information or an indirect reference to the routing information for the destination address.

FIG. 4 includes block diagrams of two different mechanisms used to maintain RPF information in a sub-data structure. RPF information 401 is stored in the form of a bitmap, typically with one bit for each interface identifying whether or not a packet with the source address is valid if received on the corresponding interface. RPF information 402 is stored in the form of a list (e.g., array, linked list, table, set, etc.), but typically in an array with each valid interface on which a packet with the corresponding source address should be received. One embodiment uses a combination of RPF information 401 and 402, typically depending on the number of RPF entries required, and possibly on the implementation of the embodiment (e.g., if there is optimized bit manipulation or list hardware, etc.).

Figure 5A:
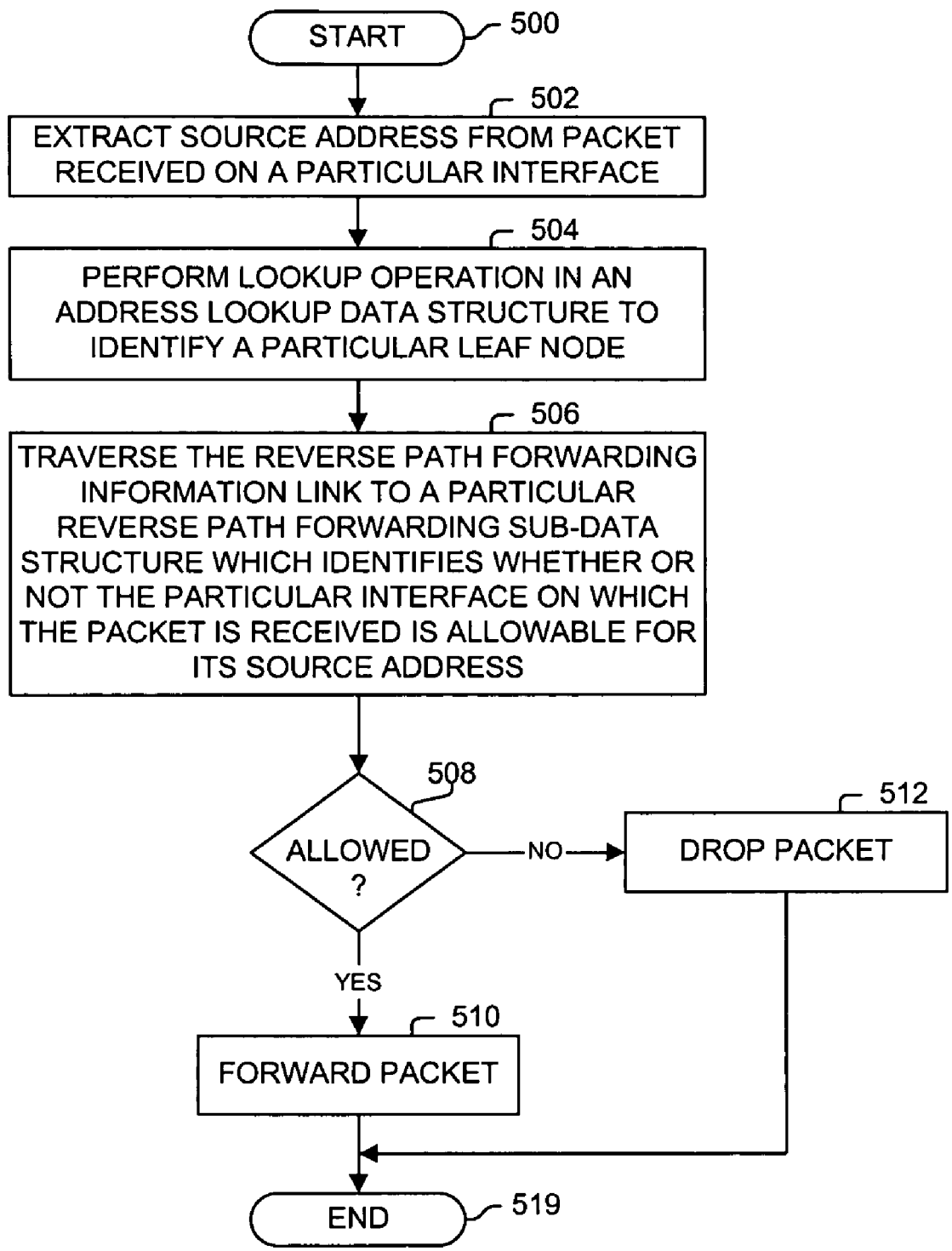
FIG. 5A is a flow diagram illustrating a process to perform RPF checking as performed in one embodiment.

FIG. 5A is a flow diagram illustrating a process to perform RPF checking as performed in one embodiment. Processing begins with process block 500, and proceeds to process block 502, wherein the source address is extracted from a particular packet received on a particular interface. Next, in process block 504, a lookup operation is performed in an address lookup data structure to identify a particular leaf node. In process block 506, the RPF information indirection reference is followed to a particular RPF sub-data structure, which identifies whether or not the particular interface on which the packet was received is allowable for its source address. As determined in process block 508, if it is allowed, then the packet is processed and forwarded as indicated in process block 510; otherwise, the packet is dropped in process block 512. Processing is complete as indicated by process block 519.

Figure 5B:
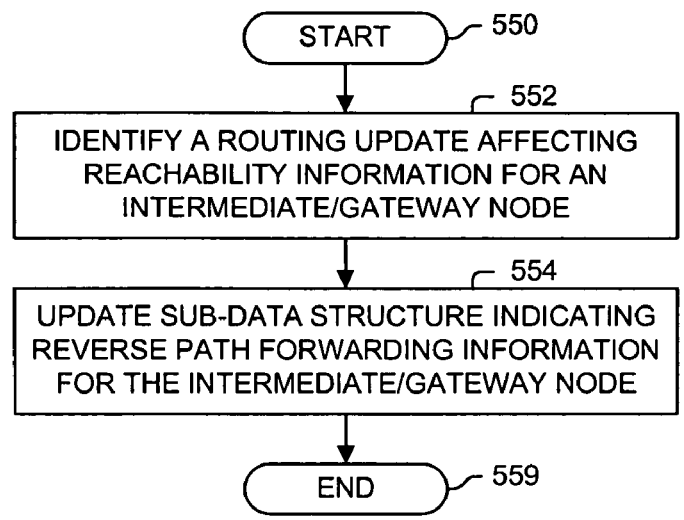
FIG. 5B is a flow diagram illustrating a process to update maintained RPF information as performed in one embodiment.

FIG. 5B is a flow diagram illustrating a process to update maintained RPF information as performed in one embodiment. Processing begins with process block 550, and proceeds to process block 552 to identify a routing update affecting reachability information for an intermediate/gateway node. As previously discussed, determining routing changes in a network is-well-known and documented, and therefore will not be repeated herein, and any route update identification mechanism can be used. In process block 554, the RPF information in the corresponding sub-data structure is updated, and processing is complete as indicated by process block 559.

Figure 6A:
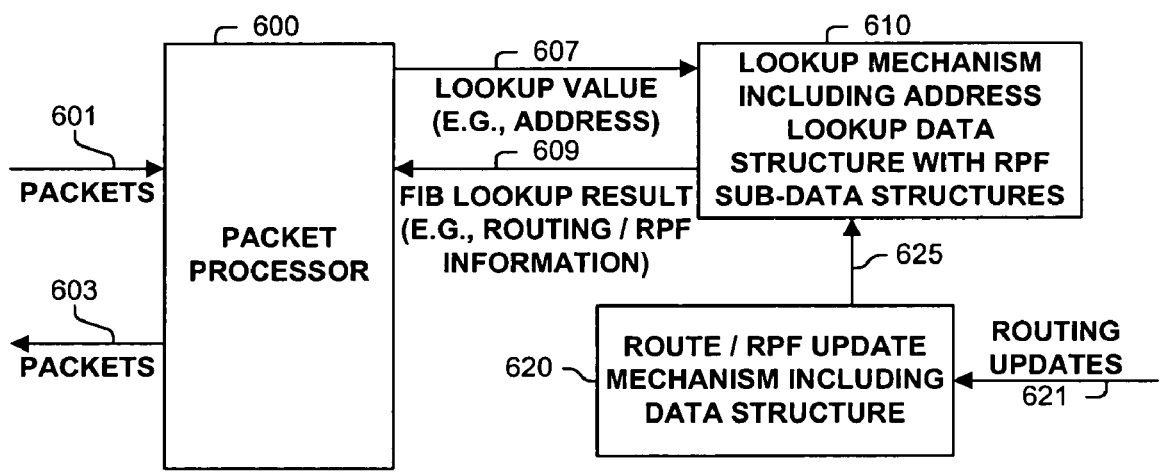
FIG. 6A is a block diagram of a system or component used in one embodiment.

FIG. 6A is a block diagram of a system or component used in one embodiment. As shown, packets 601 are received by packet processor 600. In performing an RPF check, the source address of the packet is provided (607) to lookup mechanism 610, which typically includes an address lookup data structure and possibly the RPF sub-data structures. The lookup result is provided (609) to packet processor 600. In one embodiment, the lookup result 609 includes a list of valid (and/or invalid) interfaces on which the packet with the corresponding address can be validly received. In one embodiment, the interface on which the packet is received is also provided (607) to lookup mechanism 610, and an indication is returned (609) to packet processor 600 whether or not the packet was received on a RPF valid interface. Packet processor 600 processes and typically forwards RPF valid packets 603. In one embodiment, the address lookup data structure and RPF sub-data structures of lookup mechanism 610 are updated (625) by route/RPF update mechanism 620 based on received routing updates (e.g., BGP, IGP updates) 621.

Figure 6B:
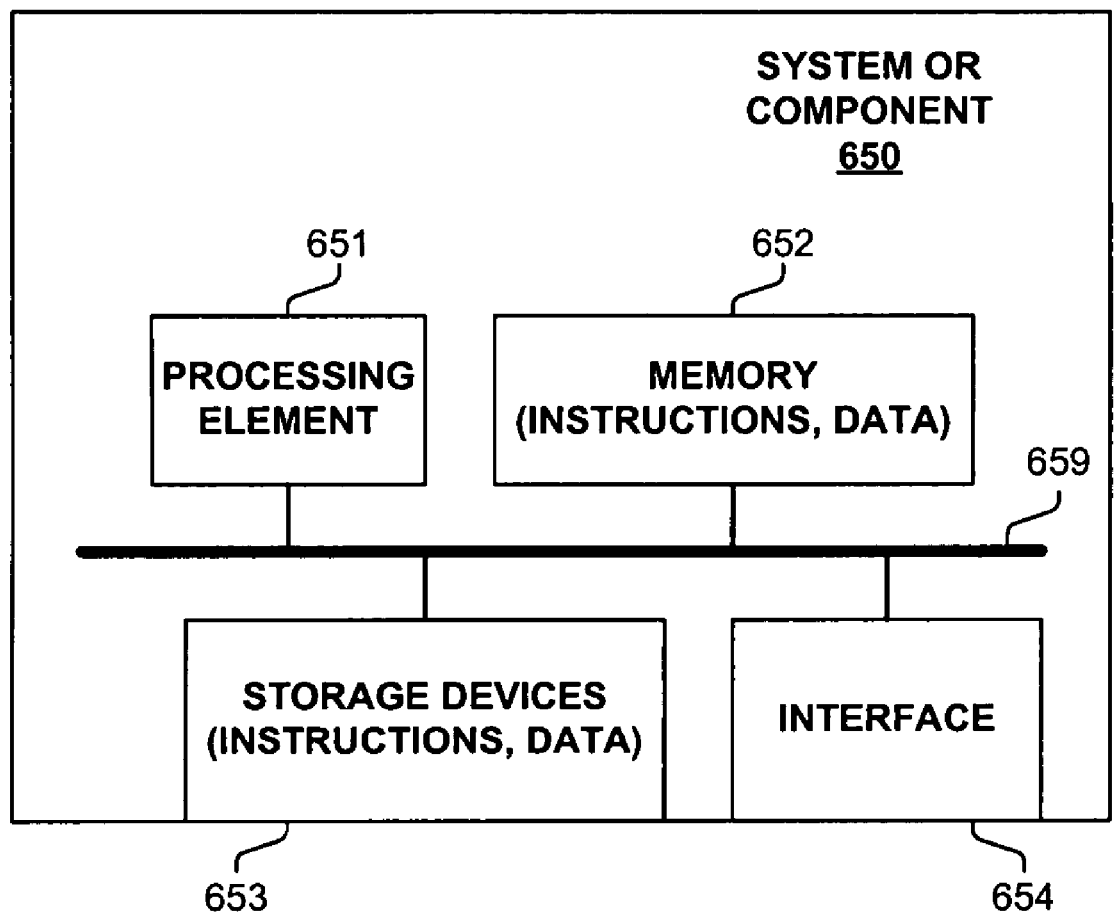
FIG. 6B is a block diagram of a system or component used in one embodiment.

FIG. 6B is a block diagram of a system component 650 used in one embodiment searching for maintaining and using a data structure identifying for multiple addresses the reverse path forwarding information for a common intermediate node. In one embodiment, system or component 650 performs one or more processes corresponding to one of the flow diagrams illustrated or otherwise described herein.

In one embodiment, system or component 650 includes a processing element 651, memory 652, storage devices 653, an interface 654 for sending and receiving information/data items and/or communicating with external devices (e.g. one or more memories and/or lookup mechanisms), which are typically coupled via one or more communications mechanisms 659, with the communications paths typically tailored to meet the needs of the application. Various embodiments of component 650 may include more or less elements. The operation of component 650 is typically controlled by processing element 651 using memory 652 and storage devices 653 to perform one or more tasks or processes. Memory 652 is one type of computer-readable medium, and typically comprises random access memory (RAM), read only memory (ROM), flash memory, integrated circuits, and/or other memory components. Memory 652 typically stores computer-executable instructions to be executed by processing element 651 and/or data which is manipulated by processing element 651 for implementing functionality in accordance with an embodiment. Storage devices 653 are another type of computer-readable medium, and typically comprise solid state storage media, disk drives, diskettes, networked services, tape drives, and other storage devices. Storage devices 653 typically store computer-executable instructions to be executed by processing element 651 and/or data which is manipulated by processing element 651 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. One or more tangible computer-readable media encoded thereon a data structure, the data structure comprising:
   an address lookup data structure for identifying leaf nodes of a plurality of leaf nodes corresponding to matching addresses, each of the plurality of leaf nodes including a reverse path forwarding indirection link to a corresponding sub-data structure indicating reverse path forwarding information;
   wherein each of a particular plurality of the plurality of leaf nodes having a same intermediate reachability node in a network includes a particular indirection link to a same particular sub-data structure indicating reverse path forwarding information.

2. The computer-readable media of claim 1, wherein the particular sub-data structure indicates one or more allowable interfaces using a bitmap representation.

3. The computer-readable media of claim 1, wherein the particular sub-data structure indicates one or more allowable interfaces using a list of interface identifiers.

4. The computer-readable media of claim 1, wherein the intermediate reachability node is a gateway node to a different intranet.

5. A method for determining reverse path forwarding information, the method comprising:
   performing a lookup operation on an address lookup data structure based on a particular address of a particular packet to identify a leaf node of a plurality of leaf nodes corresponding to the particular address, the leaf node including a reverse path forwarding indirection link; and
   traversing the reverse path forwarding indirection link to a particular reverse path sub-data structure identifying whether or not an interface on which the particular packet was received was allowable or not;
   wherein each of a particular plurality of the plurality of leaf nodes having a same intermediate reachability node in a network includes a particular indirection link to the particular sub-data structure, and the particular plurality of the plurality of leaf nodes includes the leaf node.

6. The method of claim 5, wherein the intermediate reachability node is a gateway node to a different intranet.

7. An apparatus for determining reverse path forwarding information, the apparatus comprising:
   means for performing a lookup operation on an address lookup data structure based on a particular address of a particular packet to identify a leaf node of a plurality of leaf nodes corresponding to the particular address, the leaf node including a reverse path forwarding indirection link; and means for traversing the reverse path forwarding indirection link to a particular reverse path sub-data structure identifying whether or not an interface on which the particular packet was received was allowable or not;

wherein each of a particular plurality of the plurality of leaf nodes having a same intermediate reachability node in a network includes a particular indirection link to the particular sub-data structure, and the particular plurality of the plurality of leaf nodes includes the leaf node.

8. The apparatus of claim 7, comprising means for updating the particular sub-data structure in response to identifying a routing update affecting reachability information for the same intermediate reachability node in the network.

9. The apparatus of claim 8, wherein the intermediate reachability node is a gateway node to a different intranet.

10. The apparatus of claim 7, wherein the intermediate reachability node is a gateway node to a different intranet.

11. An apparatus for performing lookup operations to identify reverse path forwarding information, the apparatus comprising:

one or more computer-readable media configured to store an address lookup data structure for identifying leaf nodes of a plurality of leaf nodes corresponding to matching addresses; and one or more lookup engines for performing lookup operations on the address lookup data structure;

wherein each of the plurality of leaf nodes in the data structure includes a reverse path forwarding indirection link to a corresponding sub-data structure indicating reverse path forwarding information, and each of a particular plurality of the plurality of leaf nodes having a same intermediate reachability node in a network includes a particular indirection link to a same particular sub-data structure indicating reverse path forwarding information.

12. The apparatus of claim 11, wherein the intermediate reachability node is a gateway node to a different intranet.

* * * * *